US012659583B2

(12) United States Patent
Talagala et al.

(10) Patent No.: US 12,659,583 B2
(45) Date of Patent: Jun. 16, 2026

(54) CONTRAST-BASED AUTOFOCUS

(71) Applicant: Arm Limited, Cambridge (GB)

(72) Inventors: Dumidu Sanjaya Talagala, West Midlands (GB); David Hanwell, Sale (GB)

(73) Assignee: Arm Limited, Cambridge (GB)

( * ) Notice: Subject to any disclaimer, the term of this patent is extended or adjusted under 35 U.S.C. 154(b) by 99 days.

(21) Appl. No.: 18/750,479

(22) Filed: Jun. 21, 2024

(65) Prior Publication Data

US 2025/0392816 A1 Dec. 25, 2025

(51) Int. Cl.
*H04N 23/67* (2023.01)
*H04N 23/71* (2023.01)

(52) U.S. Cl.
CPC ........... *H04N 23/673* (2023.01); *H04N 23/71* (2023.01)

(58) Field of Classification Search
None
See application file for complete search history.

(56) References Cited

U.S. PATENT DOCUMENTS

| | | | | |
|---|---|---|---|---|
| 11,893,720 B1 * | 2/2024 | Dutta Choudhury | .. | G06V 20/20 |
| 2016/0021295 A1 * | 1/2016 | Krestyannikov | .... | H04N 23/673 |
| | | | | 348/345 |

FOREIGN PATENT DOCUMENTS

| | | | | | |
|---|---|---|---|---|---|
| CN | 106134178 B | * | 2/2018 | ............. | H04N 23/80 |
| WO | WO-2017088662 A1 | * | 6/2017 | ........... | H04N 23/673 |

OTHER PUBLICATIONS

English translation of CN-106134178-B, Irie, 2018 (Year: 2018).*
English translation of WO-2017088662-A1, Ji, 2017 (Year: 2017).*

* cited by examiner

*Primary Examiner* — James M Hannett
(74) *Attorney, Agent, or Firm* — Berkeley Law & Technology Group, LLP

(57) ABSTRACT

The present disclosure relates to a method of contrast-based autofocus for an image capture device, the method comprising: obtaining first sensor data representative of a first contrast characteristic of one or more images captured with a first focus setting, the first sensor data comprising first data values from respective image zones of the one or more images, an image zone being a region of an image; obtaining second sensor data representative of a second contrast characteristic of the one or more images, the second sensor data comprising second data values from respective image zones of the one or more images; processing the first sensor data by performing a first filtering operation on the first sensor data to obtain a first contrast characteristic metric, the first filtering operation being determined by the first contrast characteristic and based on the first sensor data of at least one image zone on a first image of the one or more images and one or more image zones related to the at least one image zone; processing the second sensor data by performing a second filtering operation on the second sensor data to obtain a second contrast characteristic metric, the second filtering operation being determined by the second contrast characteristic and based on the second sensor data of the at least one image zone on the first image and one or more image zones related to the at least one image zone; and generating a contrast metric of the first focus setting based on the first contrast characteristic metric and the second contrast characteristic metric.

19 Claims, 9 Drawing Sheets

108

112

116

114

110

400

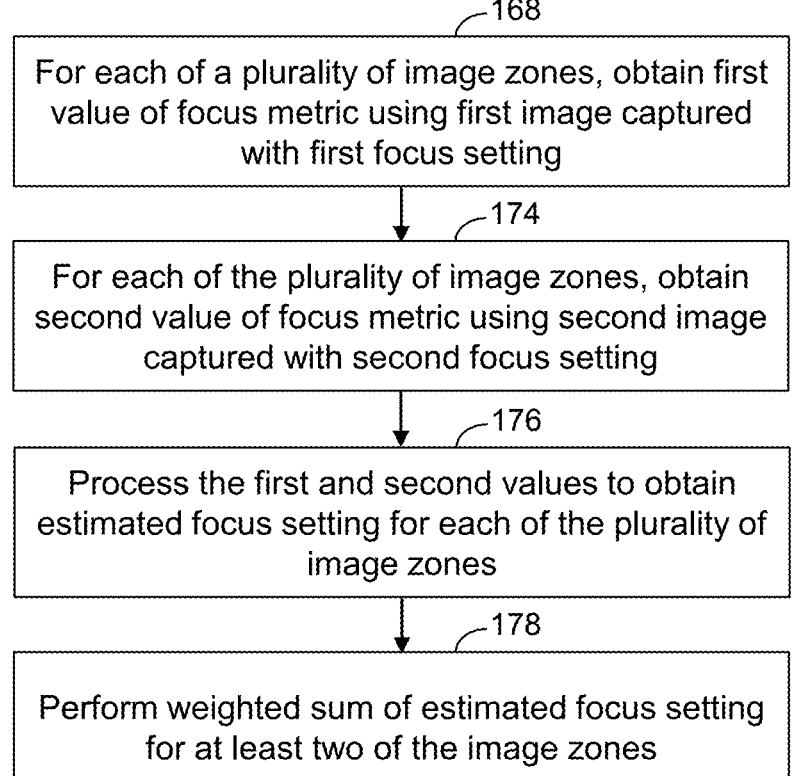

For each of a plurality of image zones, obtain first value of focus metric using first image captured with first focus setting ⌐168

For each of the plurality of image zones, obtain second value of focus metric using second image captured with second focus setting ⌐174

Process the first and second values to obtain estimated focus setting for each of the plurality of image zones ⌐176

Perform weighted sum of estimated focus setting for at least two of the image zones ⌐178

FIG. 8

CONTRAST-BASED AUTOFOCUS

FIELD

The present invention relates to contrast-based autofocus of an image capture device.

BACKGROUND

In general, an image sensor is included in image capture devices such as smartphone cameras or digital cameras to capture images. To enhance the image quality of an image captured using an image sensor, a focus setting of the image capture device including the image sensor can be adjusted appropriately, so that the image is in focus in the plane of the image sensor. The focus setting may for example be the position of a lens of the image capture device relative to an image sensor of the image capture device.

It is known to control the focus setting of an image capture device using a process known as contrast-based autofocus (AF). Contrast-based AF may be performed by measuring contrast within an image of a scene captured by an image sensor with a number of different focus settings. Typically, changing the focus setting of an image capture device may involve changing the position of a lens relative to an image sensor of the image capture device. The contrast generally increases as the focus of the image capture device improves. The focus setting used to capture the image with the highest contrast may be used as the focus setting for the image capture device for capturing subsequent images of the scene.

It is desired to improve contrast-based autofocus methods and systems.

SUMMARY

An aspect of the present technology provides method of contrast-based autofocus for an image capture device, the method comprising: obtaining first sensor data representative of a first contrast characteristic of one or more images captured with a first focus setting, the first sensor data comprising first data values from respective image zones of the one or more images, an image zone being a region of an image; obtaining second sensor data representative of a second contrast characteristic of the one or more images, the second sensor data comprising second data values from respective image zones of the one or more images; processing the first sensor data by performing a first filtering operation on the first sensor data to obtain a first contrast characteristic metric, the first filtering operation being determined by the first contrast characteristic and based on the first sensor data of at least one image zone on a first image of the one or more images and one or more image zones related to the at least one image zone; processing the second sensor data by performing a second filtering operation on the second sensor data to obtain a second contrast characteristic metric, the second filtering operation being determined by the second contrast characteristic and based on the second sensor data of the at least one image zone on the first image and one or more image zones related to the at least one image zone; and generating a contrast metric of the first focus setting based on the first contrast characteristic metric and the second contrast characteristic metric.

According to embodiments of the present technology, sensor data representative of two different characteristics (e.g. a difference measure and an intensity measure) of one or more images captured with a given focus setting is processed by performing a filtering operation on each type of sensor data that is specific to the contrast characteristic represented by the respective sensor data. In doing so, sensor data may be processed differently according to the nature of the contrast characteristic which the sensor data represents, leading to an improvement of the effectiveness of noise filtering from the sensor data.

Moreover, improvement in noise filtering facilitates the reliability and robustness of the resulting contrast metric (contrast statistics), thus improving the overall contrast-based autofocus process.

Certain image characteristics (e.g. intensity) are expected to show similarities across image zones that are spatially related, such as spatially adjacent or nearby. To reduce the effect of noise in the sensor data representative of such a contrast characteristic, two or more spatially related image zones on the same image may be treated together to generate a representative contrast characteristic metric. Thus, in some embodiments, performing the second filtering operation on the second sensor data comprises generating the second contrast characteristic metric for a group of image zones comprising the at least one image zone on the first image and one or more spatially related image zones on the first image. Herein, the group of spatially related image zones may be made up of two to any number of image zones that are spatially adjacent or nearby without touching, e.g. 9 image zones (3×3 zones), 25 image zones (5×5 zones), etc.

For example, an average or weighted average/mean may be obtained from the second sensor data of the two or more spatially related image zones and used to generate the representative contrast characteristic metric for the second contrast characteristic. Thus, in some embodiments, generating the second contrast characteristic metric for the group of image zones may comprise obtaining a weighted mean for the second sensor data of the at least one image zone and the second sensor data of the one or more spatially related image zones.

Where a representative second contrast characteristic metric is obtained for a group of spatially related image zones of the same image, a contrast metric (for the group or individual image zones of the group) may be generated using the representative second contrast characteristic metric instead of individual second contrast characteristic metric for each image zone of the group. In some embodiments, the contrast metric of the first focus setting may be generated using the second contrast characteristic metric for the group of image zones.

In some cases (e.g. in high gain settings), it may be desirable to use more than one sample (obtain more than one image) for a given focus setting to reduce the effect of noise. Thus, in some embodiments, obtaining first sensor data representative of a first contrast characteristic of one or more images may comprise obtaining the first sensor data representative of the first contrast characteristic of the first image and a second image of the one or more images; and obtaining second sensor data representative of a second contrast characteristic of one or more images may comprise obtaining the second sensor data representative of the second contrast characteristic of the first image and the second image.

Certain image characteristics (e.g. difference or edge) are expected to show similarities with respect to a given image zone over two or more images captured with a given focus setting. These corresponding image zones at the same position on multiple images may be regarded as temporally related to each other. To reduce the effect of noise in the sensor data representative of such a contrast characteristic, two (or more) temporally related image zones on two (or more) images captures with the same focus setting may be treated together to generate a representative contrast characteristic metric. The two (or more) temporally related image zones need not be from two (or more) consecutive images but can be any two (or more) images in a series of images captured with the same focus setting. In some embodiments, performing the first filtering operation on the first sensor data may comprise generating the first contrast characteristic metric for a group of image zones comprising the at least one image zone on the first image and a temporally related image zone on the second image.

For example, an average or weighted average/mean may be obtained from the first sensor data of the two (or more) temporally related image zones and used to generate the representative contrast characteristic metric for the first contrast characteristic. In some embodiments, generating the first contrast characteristic metric for the group of image zones may comprise obtaining a weighted mean for the first sensor data of the at least one image zone on the first image and the first sensor data of the temporally related image zone on the second image.

Where a representative first contrast characteristic metric is obtained for a group of temporally related image zones respective of a series of images, a contrast metric (for the group or individual image zones of the group) may be generated using the representative first contrast characteristic metric instead of individual first contrast characteristic metric for each image zone of the group. In some embodiments, the contrast metric of the first focus setting is generated using the first contrast characteristic metric for the group of image zones.

Where a series (two or more) of images is captured with the same focus setting, the second data of two or more images zones on the same image that are spatially related may be processed together if the second contrast characteristic (e.g. intensity) shows similarities across multiple spatially related image zones on the same image. Thus, in some embodiments, processing the second sensor data may comprise: generating the second contrast characteristic metric for a first group of image zones comprising the at least one image zone on the first image and one or more spatially related image zones on the first image; generating the second contrast characteristic metric for a second group of image zones comprising a temporally related image zone on the second image related to the at least one image zone on the first image and one or more temporally related image zones on the second image related to the one or more spatially related image zones on the first image; and performing a third filtering operation on the second sensor data to obtain a representative second contrast characteristic metric based on the respective second contrast characteristic metrics for the first and second groups of image zones, optionally by generating a weighted mean of the respective second contrast characteristic metrics for the first and second groups of image zones.

Certain contrast characteristics (e.g. intensity) may show similarities not only across two or more image zones that are spatially adjacent, but also across corresponding image zones over two (or more) images that are temporally adjacent. For such a contrast characteristic, filtering in the temporal dimension as well as spatial dimension facilitates further reduction of noise in the resulting contrast characteristic metric, and therefore leads to a more robust and reliable contrast metric.

Alternatively, it is possible to process the second sensor data (e.g. intensity data) by first performing a temporal filtering operation on the series of images, then spatially filter the result of the temporal filtering. Thus, in some embodiments, performing the second filtering operation on the second sensor data may comprise: generating the second contrast characteristic metric for a first group of image zones comprising the at least one image zone on the first image and a first temporally related image zone on the second image related to the at least one image zone on the first image; generating the second contrast characteristic metric for a second group of image zones comprising a spatially related image zone on the first image related to the at least one image zone on the first image and a second temporally related image zones on the second image related to the spatially related image zone on the first image; and performing a third filtering operation on the second sensor data to obtain a representative second contrast characteristic metric based on the respective second contrast characteristic metrics for the first and second groups of image zones, optionally by generating a weighted mean of the respective second contrast characteristic metrics for the first and second groups of image zones.

Alternatively, it is possible to process the second sensor data by performing a spatio-temporal filtering operation to filter in the spatial and temporal dimensions substantially simultaneously. Thus, in some embodiments, performing the second filtering operation on the second sensor data may comprise: obtaining respective second contrast characteristic metrics for a group of image zones comprising the at least one image zone on the first image, one or more spatially related image zones on the first image, a temporally related image zone on the second image related to the at least one image zone on the first image, and one or more temporally related image zones on the second image related to the one or more spatially related image zones on the first image; and generating a representative second contrast characteristic metric based on the respective second contrast characteristic metrics for the group of image zones, optionally by generating a weighted mean of the respective second contrast characteristic metrics for the group of image zones.

In some applications, a representative image zone may be selected, the contrast metric of which is deemed to be representative of the image (e.g. an image zone that represents a region of interest such as the centre of the image or a user-selected object, etc.). In other applications, contrast metrics for more than one image zones (or all image zones in an image) may be obtained if desired. Thus, in some embodiments, processing the first sensor data may further comprise performing the first filtering operation on the first sensor data of two or more groups of related image zones of the one or more images; and processing the second sensor data further comprises performing the second filtering operation on the second sensor data of the two or more groups of related image zones of the one or more images.

In some embodiments, generating the contrast metric of the first focus setting may comprise: generating respective contrast metrics for the two or more groups of related image zones; and obtaining a representative contrast metric based on the respective contrast metrics of the two or more groups of related image zones. For example, the representative contrast metric may be an average or a weighted average/ mean of the contrast metrics of two or more image zones. In some embodiments, the first sensor data may comprise difference data (E), the first contrast characteristic comprises a luminance difference, and the first contrast characteristic metric comprises a squared value of the processed first sensor data (E2).

In some embodiments, the second sensor data may comprise intensity data (I), the second contrast characteristic comprises a luminance intensity, and the second contrast characteristic metric comprises a squared value of the processed second sensor data (I2).

In some embodiment, the contrast metric of the first focus setting may be a function generated from the first contrast characteristic metric and the second contrast characteristic metric. For example, the contrast metric may be generated by dividing the first contrast characteristic metric by the second contrast characteristic metric. The computation of contrast statistics in the form of (E2/I2) provides a measure of contrast that is luminance invariant (i.e. where the contrast measure is robust against changes in lighting or exposure settings that occur during auto-focusing).

Another aspect of the present technology provides a method of determining a focus setting for an image capture device, the method comprising: obtaining first sensor data representative of a first contrast characteristic of one or more first images with a first focus setting, the first sensor data comprising first data values from respective image zones of the one or more first images, wherein an image zone corresponds to a region of an image; obtaining second sensor data representative of a second contrast characteristic of the one or more first images, the second sensor data comprising second data values from respective image zones of the one or more first images; processing the first sensor data by performing a first filtering operation on the first sensor data to obtain a first contrast characteristic metric, the first filtering operation being determined by the first contrast characteristic and based on the first sensor data of at least one subset of related image zones of the one or more first images; processing the second sensor data by performing a second filtering operation on the second sensor data to obtain a second contrast characteristic metric, the second filter being determined by the second contrast characteristic and based on the second sensor data of the at least one subset of related image zones of the one or more first images; generating a first contrast metric for the first focus setting based on the first contrast characteristic metric and the second contrast characteristic metric; and determining an operating focus setting for the image capture device based on the first contrast metric.

In order to determine an appropriate focus setting for the image capture device, the autofocus process may test more than one focus setting to determine, out of the more than one focus setting, an operating focus setting to be used by the image capture device to capture a given scene. In some embodiments, the method may further comprise: obtaining first sensor data representative of the first contrast characteristic of one or more second images captured with a second focus setting, the first sensor data comprising first data values from respective image zones of the one or more second images; obtaining second sensor data representative of the second contrast characteristic of the one or more second images, the second sensor data comprising second data values from respective image zones of the one or more second images; processing the first sensor data of the one or more second images by performing the first filtering operation to the first sensor data of the one or more second images to obtain a first contrast characteristic metric of the second image set, the first filtering operation being determined by the first contrast characteristic and based on the first sensor data of at least one subset of related image zones of the one or more second images; processing the second sensor data of the second image set by performing a second filtering operation on the second sensor data of the one or more second images to obtain a second contrast characteristic metric of the one or more second images, the second filter being determined by the second contrast characteristic and based on the second sensor data of the at least one subset of related image zones of the one or more second images; and generating a second contrast metric for the second focus setting based on the first contrast characteristic metric of the one or more second images and the second contrast characteristic metric of the one or more second images, wherein the operating focus setting for the image capture device is determined based at least on a comparison between the first contrast metric and the second contrast metric.

In general, higher contrast metric is deemed to represent better focus for the image capture device. In some embodiments, the operating focus setting may be determined based on a comparison between the first contrast metric and the second contrast metric and selecting a focus setting with a higher contrast metric.

A further aspect of the present technology provides an apparatus for processing image data, the apparatus comprising processing circuitry to: obtain first sensor data representative of a first contrast characteristic of one or more images captured with a first focus setting, the first sensor data comprising first data values from respective image zones of the one or more images, an image zone being a region of an image; obtain second sensor data representative of a second contrast characteristic of the one or more images, the second sensor data comprising second data values from respective image zones of the one or more images; process the first sensor data by performing a first filtering operation on the first sensor data to obtain a first contrast characteristic metric, the first filtering operation being determined by the first contrast characteristic and based on the first sensor data of at least one image zone on a first image of the one or more images and one or more image zones related to the at least one image zone; process the second sensor data by performing a second filtering operation on the second sensor data to obtain a second contrast characteristic metric, the second filtering operation being determined by the second contrast characteristic and based on the second sensor data of the at least one image zone on the first image and one or more image zones related to the at least one image zone; and generate a contrast metric of the first focus setting based on the first contrast characteristic metric and the second contrast characteristic metric.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments will now be described, with reference to the accompanying drawings, in which:

FIG. 8 shows a flow diagram of an exemplary method for determining a focus setting for an image capture device.

DETAILED DESCRIPTION

Figure 1:
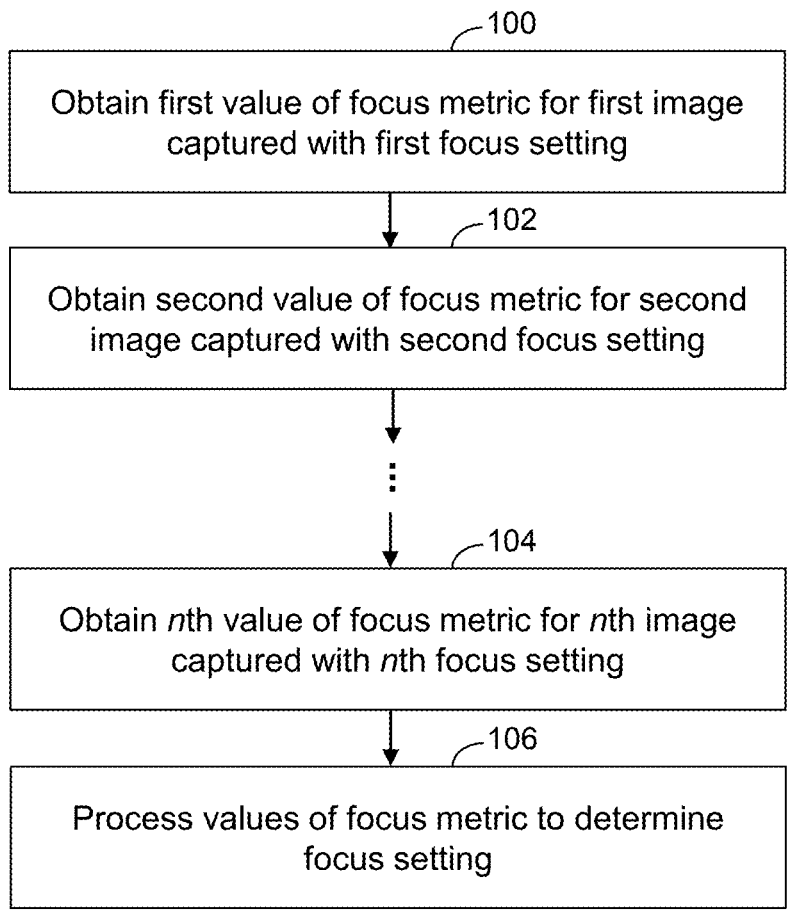
FIG. 1 shows a flow diagram of an exemplary method of determining a focus setting for an image capture device.

Embodiments of the present technology provides a method of contrast-based autofocus of an image capture device. The method may be performed to obtain contrast statistics for the image capture device under different focus settings. At a given focus setting, e.g. at a given relative distance between a lens and an image sensor of the image capture device, the image capture device may capture an image to be analysed to obtain contrast statistics for the given focus setting using the image. In the embodiments, first sensor data representative of a first contrast characteristic of the image is obtained. Moreover, second sensor data representative of a second different contrast characteristic of the image is obtained. Herein, an image may be regarded as being formed of a plurality of image zones, where an image zone is spatial area within the image and may e.g. includes one or more pixels, each image zone corresponds to a region of an image sensor of the image capture device. Then, the first sensor data comprises first data values from respective image zones of the image, and the second sensor data comprises second data values from respective image zones of the image. According to the embodiments, the first sensor data and the second sensor data are processed differently. The first sensor data is processed to obtain a first contrast characteristic metric by performing a first filtering operation that is determined by the first contrast characteristic, and the first filtering operation is performed on the first sensor data of an image zone on the image and one or more image zones adjacent that image zone. The second sensor data is processed to obtain a second contrast characteristic metric by performing a second filtering operation that is determined by the second contrast characteristic, and the second filtering operation is performed on the second sensor data of an image zone and one or more image zones adjacent that image zone. Then, a contrast metric for the given focus setting may be generated based on a ratio between the first contrast characteristic metric and the second contrast characteristic metric.

According to embodiments of the present technology, sensor data representative of two different contrast characteristics (e.g. a difference measure and an intensity measure) obtained from an image captured with a given focus setting is processed differently by performing a filtering operation that is specific to each contrast characteristic. In doing so, sensor data may be processed according to the nature of the contrast characteristic which the sensor data represents, leading to more effective noise filtering of the sensor data. Moreover, the improvement in noise filtering facilitates the reliability and robustness of the resulting contrast metric (contrast statistics), thus improving the overall contrast-based autofocus process.

Decoupling difference from intensity in contrast statistics enables spatial and temporal filtering of the statistics that would otherwise not be possible, and the filtering reduces the noise in the statistics and results in more reliable statistics.

Techniques described herein enable effective noise reduction on sensor data to be used for generating contrast metrics through decoupling sensor data obtained from an image into two channels—first sensor data representative of a first contrast characteristic and second sensor data representative of a second contrast characteristic. As such, techniques described herein improve the robustness and reliability of contrast statistics used in contrast-based autofocus.

Introduction to Contrast-Based Autofocus

To put the examples herein into context, an example of contrast-based autofocus (AF) will be described generally, with reference to FIGS. 1 and 2.

FIG. 1 is a flow diagram showing a method of determining a focus setting for an image capture device according to examples. The method is for contrast-based AF, which is for example an iterative process in which a focus setting for an image capture device is determined based on a value of a focus metric (e.g. contrast). The image capture device may for example be a smartphone camera, a standalone digital camera, a digital camera coupled to, or incorporated in, a further electronic device or a computer. The focus setting may for example be the position of a lens of the image capture device relative to an image sensor of the image capture device. The sharpness of an image captured by the image capture device typically depends on the focus setting. Hence, by determining the appropriate focus setting, images of a scene (or a region of interesting within the scene) can be captured which appear sharp, rather than diffuse or blurry.

At item 100 of FIG. 1, a first value of a focus metric is obtained for a first image captured by the image capture device with a first focus setting. Various different focus metrics may be used. For contrast-based AF, the focus metric for example may represent or otherwise depend on, or be based on, a contrast within a captured image. Contrast is for example a difference in luminance and/or colour within an image (or image portion). A maximum contrast within an image (e.g. representing a difference between a maximum luminance and a minimum luminance) may be referred to as the contrast ratio or dynamic range. Contrast generally relates to relative differences rather than absolute values of luminance and/or colour, as the human visual system is more sensitive to these relative differences than absolute values of luminance and/or colour. Examples of generation of contrast data representative of a contrast-based characteristic of at least a portion of an image, for use in contrast-based AF, are described further with reference to FIG. 3.

At item 102, a second value of the focus metric is obtained for a second image captured by the image capture device with a second focus setting. For example, the first image may be captured with the lens in a first position relative to the image sensor (such as with a first distance between a vertical axis of the lens and a vertical axis of the image sensor). The second image may be captured with the lens in a second position relative to the image sensor, which is different from the first position, such as at a second distance between the vertical axes of the lens and image sensor, respectively.

This process may be repeated iteratively until a plurality of images have been taken with a plurality of different focus settings, such as a plurality of different distances between the lens and the image sensor. Then, at item 104, an nth value of the focus metric is obtained for an nth image captured by the image capture device with an nth focus setting, where n is an integer and may be predetermined or pre-set. Alternatively, the value of n may be determined during the contrast-based AF process. For example, it may be determined that capture of further images is to cease once the value of the focus metric has reached a particular value or has altered by a certain absolute or relative amount (e.g. a percentage) compared to one or more previous values. For example, a hill-climbing algorithm may be used to obtain a plurality of focus metric values in a step-by-step fashion, for a plurality of different focus settings, while monitoring the change in the focus metric value. After the value of the focus metric drops by a certain percentage or more, after stepping through one or more different focus settings, it may be determined that the focus setting to use for subsequent image capture has been passed. Capture of subsequent images with further focus settings may therefore cease.

At item 106, the values of the focus metric are processed to determine the focus setting to use for the image capture device for subsequent capture of images of the scene. The value of the focus metric may be at a maximum, or close to a maximum, when the image captured by the image capture device with a particular focus setting is in focus. That particular focus setting may then be selected as the focus setting to use for subsequent image capture, and may be considered to be an optimal focus setting for capture of the scene.

Figure 2:
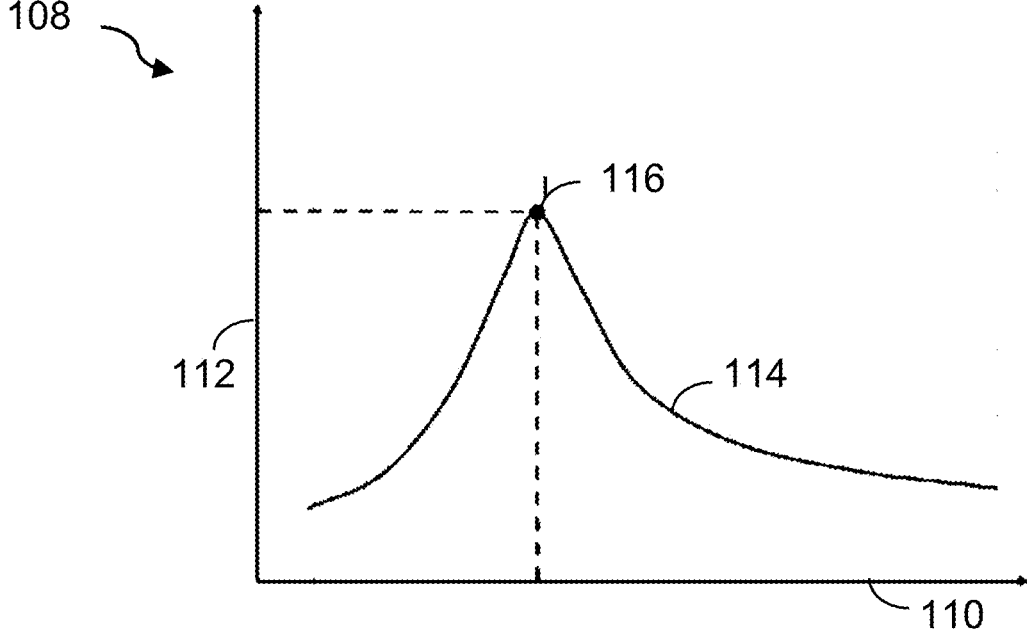
FIG. 2 shows schematically an exemplary relationship between a focus metric and a focus setting.

FIG. 2 is a graph 108 showing schematically the relationship between a focus metric and a focus setting, which in the present example is a lens position of the lens of the image capture device. The x-axis 110 of the graph 108 shows the lens position relative to the image sensor and the y-axis 112 of the graph 108 shows the value of the focus metric. The curve 114 is obtained by fitting a polynomial to a plurality of values of the focus metric obtained for a plurality of lens positions during a contrast-based AF process. The curve 114 of is an idealised curve, which has a peak point 116 corresponding to a maximum value of the focus metric. The lens position to use for the image capture device may be taken as the lens position corresponding to this peak point 116. The peak point 116 may be found analytically based on the curve 114. However, other examples may not involve the fitting of a curve to the obtained focus metric values. In such examples, the focus setting to use for subsequent image capture may for example be taken as the focus setting corresponding to the largest focus metric value obtained during the contrast-based AF process. Further examples of determining a focus setting are described in detail with reference to FIG. 8.

Generation of Contrast Data for Contrast-Based Autofocus

Figure 3:
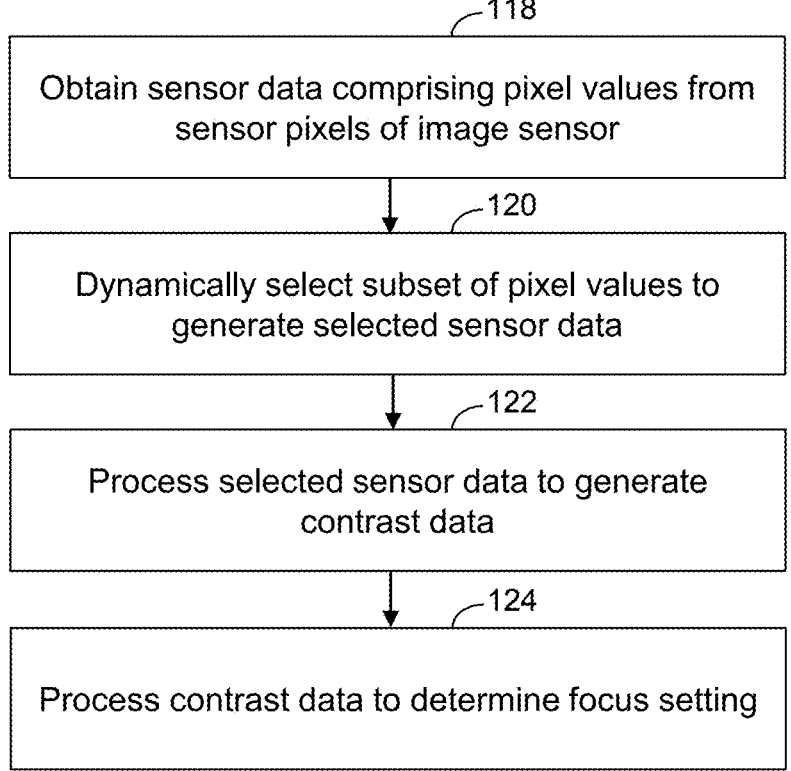
FIG. 3 shows a flow diagram of an exemplary method for contrast-based autofocus of an image capture device.

FIG. 3 is a flow diagram showing a method for contrast-based AF of an image capture device according to examples. At item 118, sensor data representative of an image captured by the image capture device is obtained. The image represented by the sensor data may be the entire image captured by the image capture device or a portion of a larger image. The sensor data is representative of a particular contrast characteristic (e.g. intensity, difference) and is derived from pixel values from respective sensor pixels of an image sensor of the image capture device. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS).

The sensor data can be derived from pixel values obtained from the image sensor and for example represent at least one characteristic of the light captured by the image sensor. For example, the sensor data may be representative of an intensity of the light captured by each sensor pixel, which may be proportional to the number of photons captured by that sensor pixel. The intensity may represent a luminance of the captured light, which is for example a measure of the intensity of light per unit area rather than an absolute intensity. In another example, the sensor data may be representative of a brightness of captured light, which may be considered to correspond to a perception of a luminance, which may or may not be proportional to the luminance. In another example, the sensor data may be representative of a difference or edge in the captured light, which may be regarded as corresponding to a luminance gradient or a measure of discontinuities in luminance. In general, the sensor data may represent any photometric quantity or characteristic that may be used to represent the visual appearance of the image represented by the sensor data.

At item 122, the selected sensor data is processed to generate contrast data representative of a contrast-based characteristic of at least a portion of the image. A contrast-based characteristic may for example be any feature of the image (or a portion of the image) which is representative of a contrast of the image or which allows a contrast to be determined or otherwise derived. There are many different contrast-based characteristics that may be used. For example, contrast-based characteristics may represent variations in a spatial or frequency domain of an image, such as edges in an image.

At item 124, the contrast data is processed to determine a focus setting for the image capture device. The contrast data may represent a value of a focus metric, which may be used to obtain a focus setting for example as described with reference to FIGS. 1 and 2. Alternatively, the contrast data may be processed to obtain a value of the focus metric, which may be in turn used to obtain the focus setting for example as described with reference to FIGS. 1 and 2.

Figure 4:
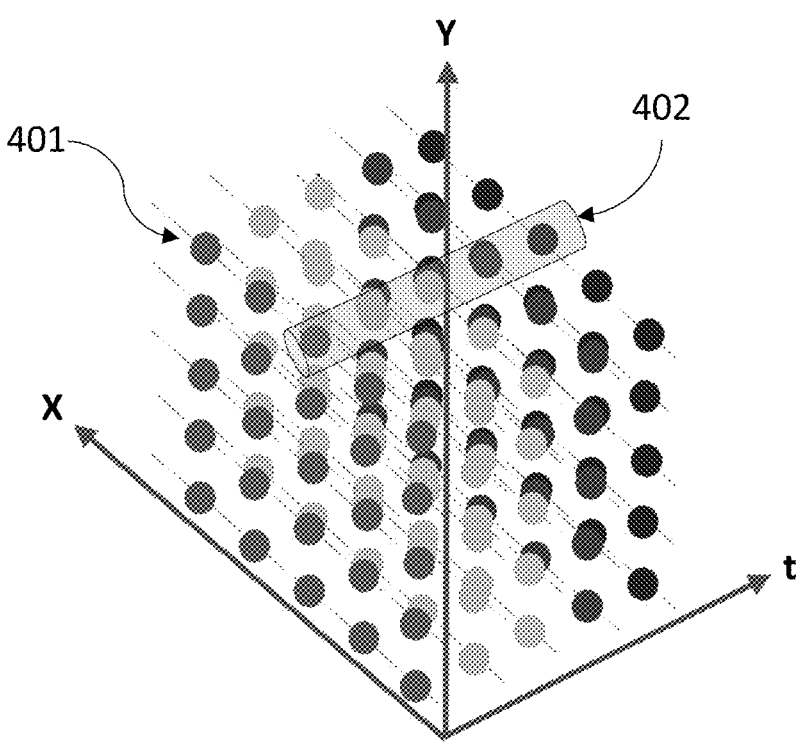
FIG. 4 schematically illustrates a first filtering operation performed on data samples of a contrast characteristic arranged in a three-dimensional space.

FIG. 4 schematically illustrates sensor data values representative of a contrast characteristic arranged in a three-dimensional space. Each dot 401 on the 3D graph 400 represents a data point arranged in the 3D space with a (spatially) horizontal x-direction, a (spatially) vertical y-direction and a temporal t-direction. The temporal axis represents (data points on) images captured with the same focus setting at different time; in other words, each layer of sampling points or dots along the t-axis represent an image captured at a specific time. For each such temporal layer, each data point or dot represents a data value representative of the given contrast characteristic (e.g. intensity) obtained for a particular region or zone within the image. Thus, data points with the same x- and y-coordinate along the t-axis represent data points in temporally related image zones that are obtained from a series of consecutive images captured with the same focus setting.

In embodiments of the present technology, two or more images may be captured with the same focus setting, and from each image, two sets of data values may be obtained each representative of a different contrast characteristic. In one example, a first contrast characteristic may be a difference or edge measure (E), and a second contrast characteristic may be an intensity measure (I).

Each image zone typically includes multiple pixel values corresponding to respective pixels on an image sensor of the image capture device (although in some cases, an image zone can include a single pixel only). Thus, in embodiments, for each image zone, pixel values for the plurality of pixels within the image zone may be combined into a representative data value for the image zone using a suitable method, for example by generating an average or mean value or a weighted average or mean value.

For an image zone at a given spatial coordinate along the t-axis, i.e. over multiple captured images with the same focus setting, the series of corresponding image zones that are temporally related is expected to show similarities in intensity (as the luminance at a particular position in the scene generally varies gradually rather than abruptly over time). Thus, according to present embodiments, intensities (second sensor data) of a series of corresponding image zones with the same spatial position on respective images that are temporally related may be processed together, or temporally filtered (first filtering operation), to reduce the noise in the intensity measurement across the group of corresponding image zones. Herein, temporal filtering may refer e.g. to extracting a mean (or weighted mean) intensity measurement across multiple corresponding image zones. Temporal filtering reduces the noise in the measured intensity of individual zones. The number of consecutive images being captured with a given focus setting may vary. It may be predetermined such that image capture ceases once a predetermined number of images is reached, or the number of images may be dependent on various factors, for example determined by the current focus setting, light condition, etc. In general, the number of images to be captured at a given focus setting may be between 2 and 5. As the number of images increases, the benefit to noise reduction diminishes. For example, temporal filtering using two samples (i.e. two images) reduces (the standard deviation of) noise by around 30%; yet in order to reduce noise by 60%, six samples may be required. For each additional image acquired, the lens of the image capture device must remain stationary (i.e. the focus setting must remain the same) for the time it takes to capture an image, which prolongs the time before the focus setting can be changed.

Corresponding image zones that are temporally related are expected to show similarities also in difference/edge measure, since changes in edge position e.g. of an object is expected to be gradual rather than abrupt. Thus, similar to the treatment of intensity measure, edge measurements (first sensor data) of a group of corresponding image zones that are temporally related may be processed together (temporally filtered) according to embodiments to reduce the effect of noise in edge measurements across multiple corresponding zones.

An example of such temporal filtering operation is illustrated in FIG. 4. In FIG. 4, cylinder 402 illustrates a series or group of data points 401 with the same spatial coordinates in respective images and are temporally related. The data points 401 may represent intensity measurements or edge measurements (or other contrast characteristic such as brightness). The data points within the cylinder 402 may be processed together, according to the embodiments, by performing a temporal filtering operation e.g. to obtain a mean or weighted mean for the group of data points.

Image zones that are spatially related, e.g. neighbouring, each other along the x- or y-axis, are expected to have similar intensity. As such, according to present embodiments, the intensity values (second sensor data) of a group of spatially related image zones comprising two or more image zones from the same image may be processed together, or spatially filtered (second filtering operation), to reduce the noise in the intensity measurement across the group of spatially related image zones. Herein, spatial filtering may refer e.g. to extracting a mean (or weighted mean) intensity measurement across multiple spatially related image zones. Spatial filtering reduces the noise in the measured intensity of individual zones. In particular, in cases where the intensity signal is small, any outliers of intensity measurement have a much smaller effect on the resulting contrast data determined based on intensity. For example, the intensity value for a given image zone may be replaced by a mean of a region of 3×3 zones (i.e. 9 zones) centred on that zone. In another example, a 5×5 bilateral filtering may be performed for a region of 5×5 zones (i.e. 25 zones) such that the intensity value for each zone in the region may be replaced by a weighted mean of the intensity value of the 25 zones.

On the other hand, edge measure does not typically show similarities across an area of an image. Thus, according to the embodiments, edge measurements of spatially related image zones that are spatially adjacent are not processed together, or spatial filtering of edge measurements is not performed, since doing so is not only unhelpful but may in fact degrade the resulting contrast measure.

Figure 5:
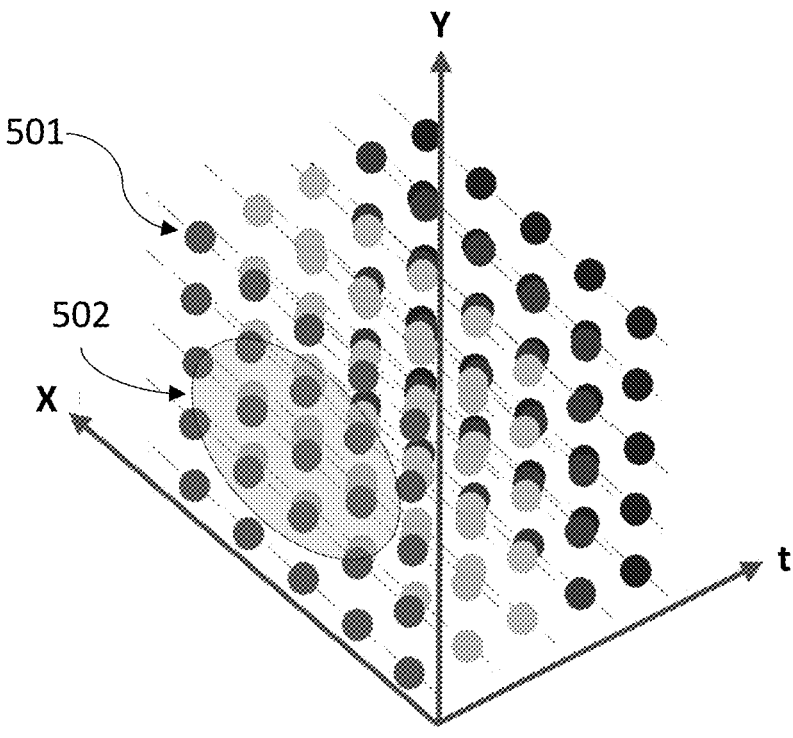
FIG. 5 schematically illustrates a second filtering operation performed on the data samples of FIG. 4.

An example of such spatial filtering operation is illustrated in FIG. 5. In FIG. 5, circle 502 illustrates a group of data points 501 obtained from the same image (having the same temporal coordinates) and are spatially adjacent. The data points 501 may represent intensity measurements (or other contrast characteristic such as brightness). The data points within the circle 502 may be processed together, according to the embodiments, by performing a spatial filtering operation e.g. to obtain a mean or weighted mean for the group of data points.

Figure 6:
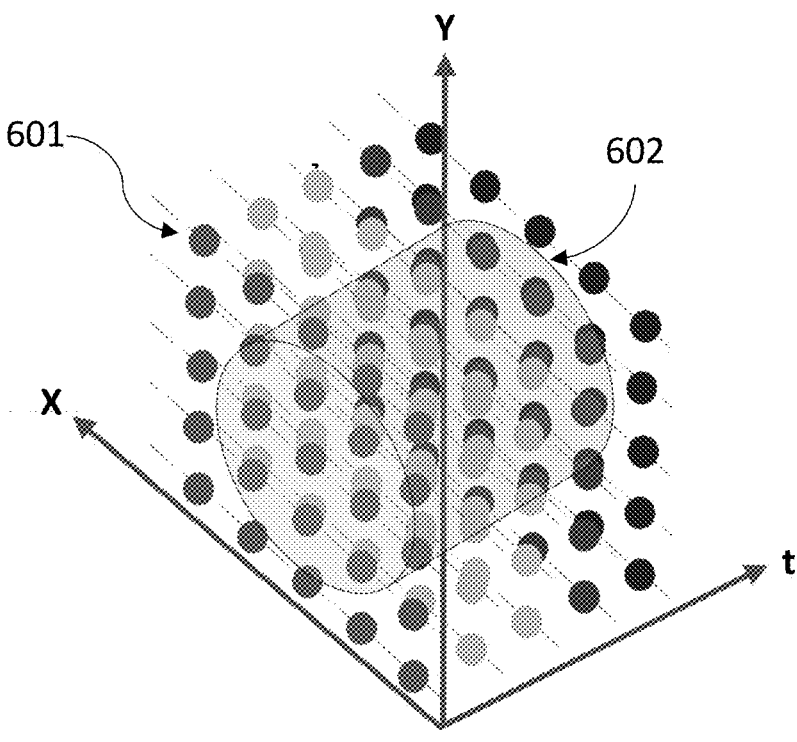
FIG. 6 schematically illustrates a third filtering operation performed on the data samples of FIG. 4.

FIG. 6 illustrates an example of spatio-temporal filtering. In FIG. 6, cylinder 602 illustrates a group of data points 601 that includes a group of spatially related, e.g. neighbouring, image zones within a first image and image zones on temporally related images that correspond to each of the neighbouring image zones on the first image (i.e. having the same spatial coordinates). The data points may for example represent intensities obtained from respective image zones. In some embodiments, the group of data points may first be spatially filtered with respect to each image, then the spatially filtered result of each image may be temporally filtered to obtain the final spatio-temporally filtered intensity value for the group. In other embodiments, it may be desirable to first performed temporal filtering on each series of corresponding data points over the plurality of temporally adjacent images, then spatially filters the result. In other embodiments, the spatial and temporal filtering operations may be performed on all data points in the group substantially in parallel as a combined spatial-temporal filtering operation (third filtering operation).

It should be noted that a group of image zones regarded as spatially related and therefore processed together needs not include image zones that are spatially immediately adjacent each other. For example, in e.g. a 3×3 group of image zones, it is possible to select only e.g. a first column and a third column of image zones out of the group and disregard a second column. Similarly, a group of image zones regarded as temporally related and therefore processed together needs not include image zones of the same spatial coordinate on respective images that are consecutive.

For example, it is possible to select a corresponding image zone from e.g. a first image and a third image and disregard a second image in the series of images.

In the present embodiments, samples (data points) may be weighted differently. For example, in one-dimensional (temporal) filtering, a higher weight may be applied to more recent data. In two-dimensional (spatial) filtering, sampling weights may decay for data further away from the centre of the kernel. In three-dimensional (spatio-temporal) filtering, a combination of both may be applied where weights decrease with time and distance from the kernel centre. In the present examples, the temporal filter is cylindrical shape, while the spatial filter is circular. However, different effective shapes of filters may be applied other than cylindrical and circular, e.g. conical, reversed conical, rectangular, etc.

According to some embodiments, the (temporally and spatially) filtered intensity measurements (I) and the (temporally) filtered edge/difference measurements (E) may then be used to generate a difference to intensity ratio E2 (squared edge)/I2 (squared intensity) for each image zone or group of image zone.

After capturing two or more images with the same focus setting, the position of the lens may be changed to change the focus setting of the image capture device. Thereafter, the image capture system must wait for a few frames before capturing images with the new focus setting to allow the lens to settle in its new position (as the lens continues to vibrate after it is moved, and this vibration introduces motion blur in the images). However, while waiting for the lens to settle, it is possible to begin processing the intensity and edge values obtained with the previous focus setting during this period.

The edge to intensity ratio (E2/I2), or contrast metric, of all image zones in an image and all images with the same focus setting may then be combined to determine a representative contrast metric for the focus setting. The combining of all contrast metric for the same focus setting may be performed in various ways. Typically, a weighted average may be obtained, where image zones closer to the centre of an image are given higher weight (assuming that the camera is oriented such that the object or objects of interest are near the centre of the frame). Other methods (for example in smartphone applications) may include having a user to specify a region within the frame as the region of interest to be focused on, or using an algorithm (e.g. face detection) to select more salient regions to which higher weight is give.

In some embodiments, the plurality of image zones of an image (e.g. 15×15 zones) may be collated into fewer number of "spots" (e.g. 5×5 spots), where contrast metrics (E2/I2) from multiple image zones (e.g. 3×3 zones) are accumulated into a single contrast metric. Then, the contrast metric of each spot may be assessed (e.g. by plotting a contrast curve for each spot) to determine a suitable (or optimal) focus setting for each spot, and then to determine a suitable (or optimal) focus setting for the overall image. In some examples, each spot may be a single image zone. The present embodiment may be useful in cases where the image capture device is focusing on a small object with respect to the overall image size, in which case accumulating the statistics for the full frame (instead of assessing multiple "spots") may lead to the rest of the image drowning out the effect of the small object.

Figure 7:
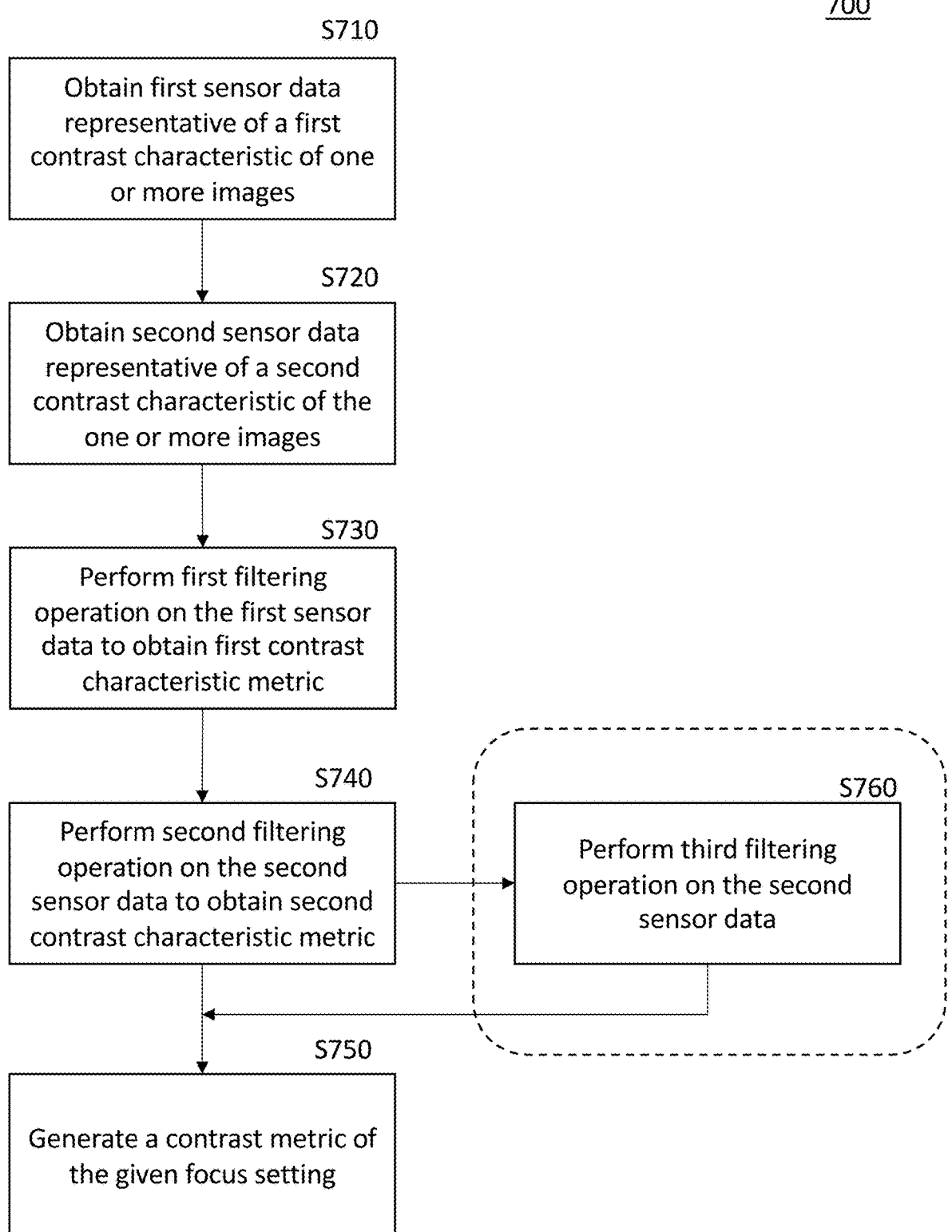
FIG. 7 shows a flow diagram of an exemplary method for contrast-based autofocus of an image capture device according to embodiments.

FIG. 7 shows a flow diagram of an exemplary method of contrast-based autofocus suitable for an image capture device according to embodiments. The method begins at S710, where first sensor data representative of a first contrast characteristic of one or more images captured, e.g. by the image capture device, with a first focus setting is obtained. The first sensor data comprises first data values from respective image zones of the one or more images, wherein an image zone is a region of an image. In relation to an image capture device, an image zone may correspond to a region of an image sensor of the image capture device.

Then at S720, second sensor data representative of a second contrast characteristic of the one or more images is obtained. The second sensor data comprises second data values from respective image zones of the one or more images.

In some embodiments, the first sensor data may comprise difference data, the first contrast characteristic may comprise a luminance difference or edge, and the first contrast characteristic metric may comprise a squared value of the processed first sensor data. In some embodiments, the second sensor data may comprise intensity data, the second contrast characteristic may comprise a luminance intensity, and the second contrast characteristic metric may comprise a squared value of the processed second sensor data.

At S730, the first sensor data is processed by performing a first filtering operation on the first sensor data to obtain a first contrast characteristic metric. The first filtering operation is determined by the first contrast characteristic and based on the first sensor data of at least one image zone on a first image of the one or more images and one or more image zones related to the at least one image zone.

At S740, the second sensor data is processed by performing a second filtering operation on the second sensor data to obtain a second contrast characteristic metric. The second filtering operation is determined by the second contrast characteristic and based on the second sensor data of the at least one image zone on the first image and one or more image zones related to the at least one image zone.

Herein, an image zone may be described as being related to a given image zone if the image zone is spatially near the given image zone on the same image, or the image zone may be temporally near the given image zone if the image zone is at the same spatial coordinate as the given image zone but on a different image that is captured before or after the image of the given image zone. The image zone needs not be immediately adjacent, whether spatially or temporally, to the given image zone to be described as "related to", but simply sufficiently near such that the two image zones share some similarities such as intensity or difference.

In some embodiments, performing the second filtering operation on the second sensor data may comprise generating the second contrast characteristic metric for a group of image zones comprising the at least one image zone on the first image and one or more spatially related image zones on the first image.

Generating the second contrast characteristic metric for the group of image zones may comprise obtaining a weighted mean for the second sensor data of the at least one image zone and the second sensor data of the one or more spatially related image zones. The contrast metric of the first focus setting may be generated using the second contrast characteristic metric for the group of image zones.

At S750, a contrast metric of the first focus setting is generated based on the first contrast characteristic metric and the second contrast characteristic metric. In some embodiments, the contrast metric of the first focus setting may be a function generated from the first contrast characteristic metric and the second contrast characteristic metric. For example, the contrast metric may be obtained by dividing the first contrast characteristic metric by the second contrast characteristic metric (E2/I2).

In some embodiments, obtaining first sensor data representative of a first contrast characteristic of one or more images may comprise obtaining the first sensor data representative of the first contrast characteristic of the first image and a second image of the one or more images, e.g. captured by the image capture device with the first focus setting, and obtaining second sensor data representative of a second contrast characteristic of one or more images may comprise obtaining the second sensor data representative of the second contrast characteristic of the first image and the second image. The first filtering operation may be performed on the first sensor data by generating the first contrast characteristic metric for a group of image zones comprising the at least one image zone on the first image and a temporally related image zone on the second image. The first contrast characteristic metric may be generated for the group of image zones by obtaining a weighted mean for the first sensor data of the at least one image zone on the first image and the first sensor data of the temporally related image zone on the second image. Then, the contrast metric of the first focus setting may be generated using the first contrast characteristic metric for the group of image zones.

In some embodiments, processing the second sensor data may comprise performing the second filtering operation on the second sensor data that includes generating the second contrast characteristic metric for a first group of image zones comprising the at least one image zone on the first image and one or more spatially related image zones on the first image, and generating the second contrast characteristic metric for a second group of image zones comprising a temporally related image zone on the second image related to the at least one image zone on the first image and one or more temporally related image zones on the second image related to the one or more spatially related image zones on the first image, and optionally, at S760, performing a third filtering operation on the second sensor data to obtain a representative second contrast characteristic metric based on the respective second contrast characteristic metrics for the first and second groups of image zones, optionally by generating a weighted mean of the respective second contrast characteristic metrics for the first and second groups of image zones.

In alternative embodiments, processing the second sensor data may comprise generating the second contrast characteristic metric for a first group of image zones comprising the at least one image zone on the first image and a first temporally related image zone on the second image related to the at least one image zone on the first image, generating the second contrast characteristic metric for a second group of image zones comprising a spatially related image zone on the first image related to the at least one image zone on the first image and a second temporally related image zones on the second image related to the spatially related image zone on the first image, and, at S760, performing a third filtering operation on the second sensor data to obtain a representative second contrast characteristic metric based on the respective second contrast characteristic metrics for the first and second groups of image zones, optionally by generating a weighted mean of the respective second contrast characteristic metrics for the first and second groups of image zones.

In some embodiments, processing the second sensor data may comprise simultaneous performing a spatial and temporal filtering on the second sensor data, i.e. filtering in all three dimensions as shown in FIG. 6. Thus, obtaining respective second contrast characteristic metrics for a group of image zones comprising the at least one image zone on the first image, one or more spatially related image zones on the first image, a temporally related image zone on the second image related to the at least one image zone on the first image, and one or more temporally related image zones on the second image related to the one or more spatially related image zones on the first image, and generating a representative second contrast characteristic metric based on the respective second contrast characteristic metrics for the group of image zones, optionally by generating a weighted mean of the respective second contrast characteristic metrics for the group of image zones.

Then, the contrast metric of the first focus setting may be generated using the representative second contrast characteristic metric.

In some embodiments, processing the first sensor data may further comprise performing the first filtering operation on the first sensor data of two or more groups of related image zones of the one or more images, and processing the second sensor data further comprises performing the second filtering operation on the second sensor data of the two or more groups of related image zones of the one or more images. Then, generating the contrast metric of the first focus setting may comprise generating respective contrast metrics for the two or more groups of related image zones, and obtaining a representative contrast metric based on the respective contrast metrics of the two or more groups of related image zones.

Determination of Focus Setting Using Contrast Data

FIG. 8 is a flow diagram showing an exemplary method of determining a focus setting for an image capture device. The method begins at item 168, where, for each of a plurality of image zones, a first value of a focus metric for the respective image zone is obtained using a first image captured with a first focus setting for the image capture device. The first image may be divided into zones in any suitable manner. In some examples, each of the image zones may be the same size as each other; however, in other examples, some of the image zones may be different sizes than others. For example, an image may be divided into image zones based on processing of the image, e.g. to identify at least one ROI (region of interest).

At item 174, for each of a plurality of image zones, a second value of the focus metric for the respective image zone is obtained using a second image captured with a second focus setting for the image capture device. The contrast data obtained e.g. as described with reference to FIG. 3 may represent the focus metric for example. In other cases, the present method may be performed with a different focus metric.

At item 176, the first value and the second value are processed, for each of the plurality of image zones, to obtain an estimated focus setting for the respective image zone. The first and second values may be processed in various different ways to obtain the estimated focus setting.

At item 178, the focus setting is determined by performing a weighted average of the estimated focus setting for at least two of the plurality of image zones, e.g. in cases where a focus setting refers to a position or distance of a lens of the image capture device relative to an image sensor of the image capture device. The weighted average may for example account for different image characteristics of the at least two of the plurality of image zones, for example such that image zones corresponding to a ROI receive a higher weighting than other image zones; in some cases, image zones corresponding to a ROI may receive a weighting of 1 while other image zones may receive a weighting of 0.

An average estimated focus setting, for example corresponding to the central value of the distribution of the estimated focus settings, may be obtained using at least two estimated focus settings, and in some cases all of the plurality of estimated focus settings. The average estimated focus setting may be a mean, mode or median, for example.

Image Processing System

Figure 9:
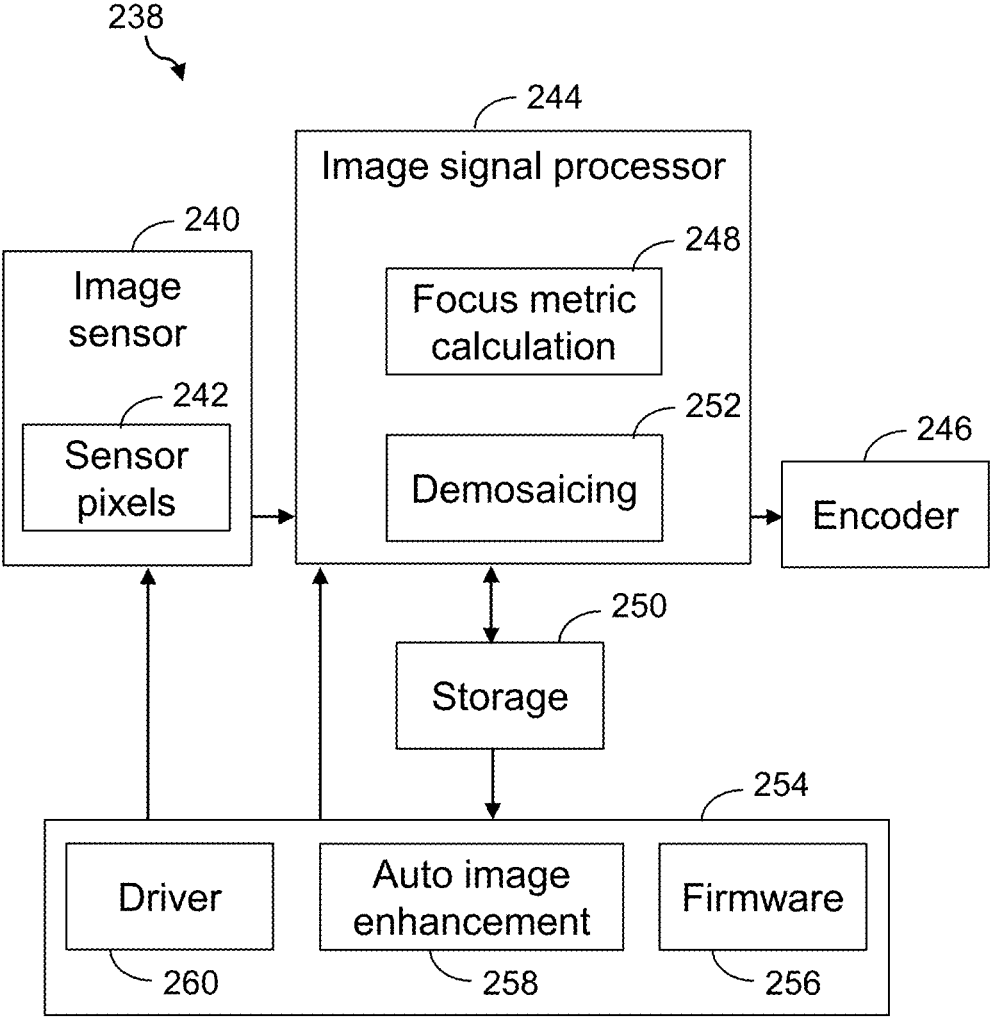
FIG. 9 shows schematically an exemplary image processing system.

The examples described herein may be implemented using an image processing system, for example image processing system 238 as illustrated schematically in FIG. 9.

The image processing system 238 includes an image sensor 240. The image sensor 240 includes sensor pixels 242 for capturing light. Light received at the image sensor 240 is converted to image data. The image data is transferred to an image signal processor 244, which is typically configured to generate output image data representative of at least part of an output image. The output image data may be encoded via an encoder 246 before being transferred to other components, for example for storage or further processing. The image signal processor 244 typically includes a number of units that are configured to perform various processing on the image data, to generate the output image data. Image signal processors such as the image signal processor 244 may include a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The image signal processor 244 in the present example is arranged to calculate a value of a focus metric such as those described herein, and may therefore be considered to include a focus metric calculation unit 248. Data for use in, or generated as part of, the focus metric calculation unit 248 may be stored in storage 250 of the image processing system 238. The storage 250 may include at least one of volatile memory, such as a Random Access Memory (RAM) and non-volatile memory, such as Read Only Memory (ROM) or a solid state drive (SSD) such as Flash memory. The storage 250 may for example be an on-chip memory or buffer that may be accessed relatively rapidly by the image signal processor 244. In other examples, the storage 250 may include further storage devices, for example magnetic, optical or tape media, compact disc (CD), digital versatile disc (DVD) or other data storage media. The storage 250 may be removable or non-removable from the image processing system 238. The storage 250 is communicatively coupled to the image signal processor 244 so that data can be transferred between the storage 250 and the image signal processor 244. For example, the storage 250 may store image data representative of at least a portion of an image (such as image data prior to demosaicing) as well as data generated during the calculation of a value of a focus metric, such as that described above.

The image signal processor 244 may also include a demosaicing system 252 for demosaicing image data for use in the focus metric calculation 248. The demosaicing system 252 may be arranged to perform grayscale demosaicing to obtain a grayscale intensity at respective pixel positions from data obtained from the image sensor (for example Bayer data). For example, the demosaicing system 252 may obtain RGB data or it may obtain grayscale data. In such cases, the sensor data used to determine the focus setting may e.g. be the grayscale data obtained by the demosaicing system 252, which may be considered to correspond to values in a grayscale intensity plane Y. In other cases, the sensor data used to determine the focus setting may be the Bayer data itself obtained from the sensor pixels prior to undergoing demosaicing.

The image processing system 238 also includes a controller 254 for controlling features or characteristics of the image sensor 240. The controller 254 may include hardware or software components or a combination of hardware and software. For example, the controller 254 may include firmware 256 which includes software for controlling the operation of the controller 254. The firmware 256 may be stored in non-volatile memory of the controller 254 or in storage 250 (which is accessible to the controller 254). The controller 254 also includes an auto image enhancement system 258, which for example is configured to perform processing to determine whether adjustments need to be made to the image processing system 238 to improve the image quality. For example, the auto image enhancement system 258 may include an auto exposure module (e.g. arranged to perform contrast-based autofocus), an auto white balance module and/or an auto focus module. For example, the auto image enhancement system 258 may include a focus controller, such as a contrast-based autofocus controller. In other cases, the focus controller may be a separate unit of the controller 254 and/or the auto image enhancement system 258 may be otherwise omitted. The controller 254 also includes a driver 260 for controlling the operation of the image sensor 240. For example, the driver 260 may control a configuration of the image sensor 240, such as a lens position, such that the image sensor 240 is in a configuration corresponding to a particular focus setting.

A data collection process, which may be referred to as a statistics collection process, may be performed using hardware, such as hardware of the controller 254 or of the image signal processor 238, such as by the focus metric calculation unit 248, which may obtain statistics (such as the contrast data) based on image data obtained by an image capture device including the image signal processor 238.

The processing of statistics, for example as described with reference to FIG. 8, to determine a focus setting for the image capture device, may for example be performed using firmware, such as the firmware 256 of the controller 254 or firmware associated with the image signal processor 244. This is not intended to be limiting, though; the focus setting may be determined using software, hardware or a combination of hardware and software, using various methods.

Components of the image signal processor 244 may be interconnected using a systems bus, which allows data to be transferred between the various components.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

What is claimed is:

1. A method of contrast-based autofocus for an image capture device, the method comprising:

obtaining first sensor data representative of a first contrast characteristic of one or more images captured with a first focus setting, the first sensor data comprising first data values from respective image zones of the one or more images, an image zone being a region of an image;

obtaining second sensor data representative of a second contrast characteristic of the one or more images, the second sensor data comprising second data values from respective image zones of the one or more images;

processing the first sensor data by performing a first filtering operation on the first sensor data to obtain a first contrast characteristic metric, the first filtering operation being determined by the first contrast characteristic and based on the first sensor data of at least one image zone on a first image of the one or more images and one or more image zones related to the at least one image zone;

processing the second sensor data by performing a second filtering operation on the second sensor data to obtain a second contrast characteristic metric, the second filtering operation being determined by the second contrast characteristic and based on the second sensor data of the at least one image zone on the first image and one or more image zones related to the at least one image zone; and generating a contrast metric of the first focus setting based on the first contrast characteristic metric and the second contrast characteristic metric.

2. The method of claim 1, wherein performing the second filtering operation on the second sensor data comprises generating the second contrast characteristic metric for a group of image zones comprising the at least one image zone on the first image and one or more spatially related image zones on the first image.

3. The method of claim 2, wherein generating the second contrast characteristic metric for the group of image zones comprises obtaining a weighted mean for the second sensor data of the at least one image zone and the second sensor data of the one or more spatially related image zones.

4. The method of claim 2, wherein the contrast metric of the first focus setting is generated using the second contrast characteristic metric for the group of image zones.

5. The method of claim 1, wherein:

obtaining first sensor data representative of a first contrast characteristic of one or more images comprises obtaining the first sensor data representative of the first contrast characteristic of the first image and a second image of the one or more images; and obtaining second sensor data representative of a second contrast characteristic of one or more images comprises obtaining the second sensor data representative of the second contrast characteristic of the first image and the second image.

6. The method of claim 5, wherein performing the first filtering operation on the first sensor data comprises generating the first contrast characteristic metric for a group of image zones comprising the at least one image zone on the first image and a temporally related image zone on the second image.

7. The method of claim 6, wherein generating the first contrast characteristic metric for the group of image zones comprises obtaining a weighted mean for the first sensor data of the at least one image zone on the first image and the first sensor data of the temporally related image zone on the second image.

8. The method of claim 6, wherein the contrast metric of the first focus setting is generated using the first contrast characteristic metric for the group of image zones.

9. The method of claim 5, wherein processing the second sensor data comprises:

generating the second contrast characteristic metric for a first group of image zones comprising the at least one image zone on the first image and one or more spatially related image zones on the first image;

generating the second contrast characteristic metric for a second group of image zones comprising a temporally related image zone on the second image related to the at least one image zone on the first image and one or more temporally related image zones on the second image related to the one or more spatially related image zones on the first image; and performing a third filtering operation on the second sensor data to obtain a representative second contrast characteristic metric based on the respective second contrast characteristic metrics for the first and second groups of image zones, optionally by generating a weighted mean of the respective second contrast characteristic metrics for the first and second groups of image zones.

10. The method of claim 5, wherein processing the second sensor data comprises:

generating the second contrast characteristic metric for a first group of image zones comprising the at least one image zone on the first image and a first temporally related image zone on the second image related to the at least one image zone on the first image;

generating the second contrast characteristic metric for a second group of image zones comprising a spatially related image zone on the first image related to the at least one image zone on the first image and a second temporally related image zones on the second image related to the spatially related image zone on the first image; and performing a third filtering operation on the second sensor data to obtain a representative second contrast characteristic metric based on the respective second contrast characteristic metrics for the first and second groups of image zones, optionally by generating a weighted mean of the respective second contrast characteristic metrics for the first and second groups of image zones.

11. The method of claim 5, wherein processing the second sensor data comprises:

obtaining respective second contrast characteristic metrics for a group of image zones comprising the at least one image zone on the first image, one or more spatially related image zones on the first image, a temporally related image zone on the second image related to the at least one image zone on the first image, and one or more temporally related image zones on the second image related to the one or more spatially related image zones on the first image; and generating a representative second contrast characteristic metric based on the respective second contrast characteristic metrics for the group of image zones, optionally by generating a weighted mean of the respective second contrast characteristic metrics for the group of image zones.

12. The method of claim 1, wherein:

processing the first sensor data further comprises performing the first filtering operation on the first sensor data of two or more groups of related image zones of the one or more images; and processing the second sensor data further comprises performing the second filtering operation on the second sensor data of the two or more groups of related image zones of the one or more images.

13. The method of claim 12, wherein generating the contrast metric of the first focus setting comprises:

generating respective contrast metrics for the two or more groups of related image zones; and obtaining a representative contrast metric based on the respective contrast metrics of the two or more groups of related image zones.

14. The method of claim 1, wherein the contrast metric of the first focus setting is a function generated from the first contrast characteristic metric and the second contrast characteristic metric.

15. The method of claim 1, wherein the first sensor data comprises difference data, the first contrast characteristic comprises a luminance difference, and the first contrast characteristic metric comprises a squared value of the processed first sensor data.

16. The method of claim 1, wherein the second sensor data comprises intensity data, the second contrast characteristic comprises a luminance intensity, and the second contrast characteristic metric comprises a squared value of the processed second sensor data.

17. A method of determining a focus setting for an image capture device, the method comprising:

obtaining first sensor data representative of a first contrast characteristic of one or more first images with a first focus setting, the first sensor data comprising first data values from respective image zones of the one or more first images, wherein an image zone corresponds to a region of an image;

obtaining second sensor data representative of a second contrast characteristic of the one or more first images, the second sensor data comprising second data values from respective image zones of the one or more first images;

processing the first sensor data by performing a first filtering operation on the first sensor data to obtain a first contrast characteristic metric, the first filtering operation being determined by the first contrast characteristic and based on the first sensor data of at least one subset of related image zones of the one or more first images;

processing the second sensor data by performing a second filtering operation on the second sensor data to obtain a second contrast characteristic metric, the second filtering operation being determined by the second contrast characteristic and based on the second sensor data of the at least one subset of related image zones of the one or more first images;

generating a first contrast metric for the first focus setting based on the first contrast characteristic metric and the second contrast characteristic metric; and determining an operating focus setting for the image capture device based on the first contrast metric.

18. The method of claim 17, further comprising:

obtaining first sensor data representative of the first contrast characteristic of one or more second images captured with a second focus setting, the first sensor data comprising first data values from respective image zones of the one or more second images;

obtaining second sensor data representative of the second contrast characteristic of the one or more second images, the second sensor data comprising second data values from respective image zones of the one or more second images;

processing the first sensor data of the one or more second images by performing the first filtering operation to the first sensor data of the one or more second images to obtain a first contrast characteristic metric of the one or more second images, the first filtering operation being determined by the first contrast characteristic and based on the first sensor data of at least one subset of related image zones of the one or more second images;

processing the second sensor data of the one or more second images by performing a second filtering operation on the second sensor data of the one or more second images to obtain a second contrast characteristic metric of the one or more second images, the second filtering operation being determined by the second contrast characteristic and based on the second sensor data of the at least one subset of related image zones of the one or more second images; and generating a second contrast metric for the second focus setting based on the first contrast characteristic metric of the one or more second images and the second contrast characteristic metric of the one or more second images, wherein the operating focus setting for the image capture device is determined based at least on a comparison between the first contrast metric and the second contrast metric.

19. An apparatus for processing image data, the apparatus comprising processing circuitry to:

obtain first sensor data representative of a first contrast characteristic of one or more images captured with a first focus setting, the first sensor data comprising first data values from respective image zones of the one or more images, an image zone being a region of an image;

obtain second sensor data representative of a second contrast characteristic of the one or more images, the second sensor data comprising second data values from respective image zones of the one or more images;

process the first sensor data by performing a first filtering operation on the first sensor data to obtain a first contrast characteristic metric, the first filtering operation being determined by the first contrast characteristic and based on the first sensor data of at least one image zone on a first image of the one or more images and one or more image zones related to the at least one image zone;

process the second sensor data by performing a second filtering operation on the second sensor data to obtain a second contrast characteristic metric, the second filtering operation being determined by the second contrast characteristic and based on the second sensor data of the at least one image zone on the first Image and one or more image zones related to the at least one image zone; and generate a contrast metric of the first focus setting based on the first contrast characteristic metric and the second contrast characteristic metric.

* * * * *